Figure 1:
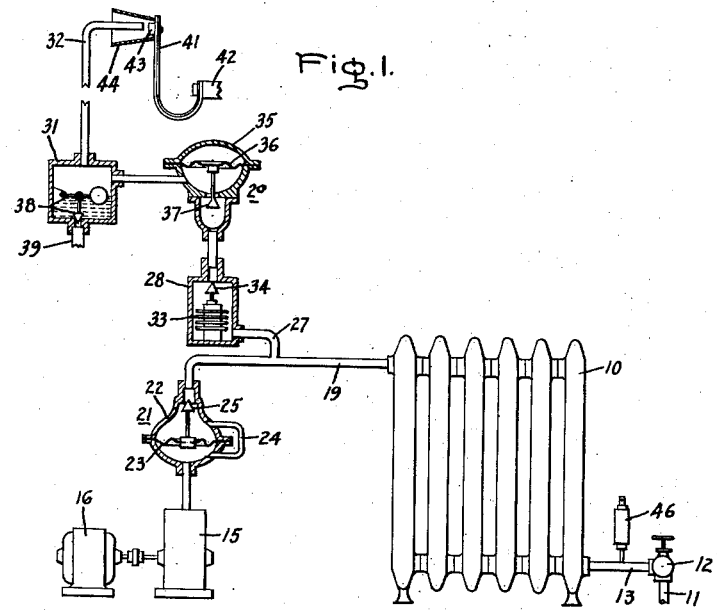

Oct. 7, 1941.  H. R. CRAGO  2,258,239

HEATING SYSTEM

Filed Nov. 15, 1939

Inventor:
Harry R. Crago,
by Harry E. Dunham
His Attorney.

Patented Oct. 7, 1941

2,258,239

UNITED STATES PATENT OFFICE 2,258,239

HEATING SYSTEM

Harry R. Crago, Schenectady, N. Y., assignor to General Electric Company, a corporation of New York Application November 15, 1939, Serial No. 304,569

12 Claims. (Cl. 237—10)

This invention relates to heating systems and more particularly to arrangements for controlling the effective heat radiating surface of a heat exchanger supplied with heating fluid such as steam.

In heating enclosures or dwelling houses and the like, it is necessary to provide a heater of such capacity as will produce the desired temperature within the enclosure during the coldest weather condition to be experienced. As the heating capacity of the heater is therefore much greater than that normally necessary for satisfying the heating demand during the greater part of the heating season, it is desirable in order to more satisfactorily and more efficiently heat the enclosure to arrange some means for controlling or modulating the heat supply to the enclosure in accordance with the immediate demand. In the case of dwellings heated from a boiler furnace and having a steam radiator arranged in each room, the effective heat radiating surface of each radiator may be controlled by regulating the amount of air within the radiator. Upon a demand for more heat by the enclosure, a certain amount of air may be vented from the radiator thereby increasing the effective heat radiating surface of the radiator and conversely, upon the room temperature rising above a predetermined value, air may be introduced into the radiator to slightly diminish the effective heat radiating surface thereof. In order to maintain an even temperature of the enclosure, that is, to prevent under and overshooting of the temperature, the effective heat radiating surface may be continuously controlled or modulated so that the amount of heat supplied to the enclosure balances at all times with the heat losses therefrom. In the case of the ordinary domestic type furnace which is usually adapted for periodic operation, the steam pressure will vary considerably between minimum and maximum limits. The operation of the furnace may be controlled by the steam pressure and in order to permit the furnace to run on reasonable operating cycles, a differential of at least three or four pounds per square inch in the setting of the pressure responsive control device is desirable. Considering that the maximum steam pressure of such a furnace is usually of the order of five or six pounds per square inch, and the minimum about one pound, the differential represents a relatively wide pressure swing. Such differences in pressure of the steam supplied to a radiator will cause a material variation in the effective heat radiating surface thereof for any given amount of air within the radiator due to the compression and expansion of the air with the rise and fall of steam pressure. Thus special consideration must be given to the pressure variations of the steam supply if the effective heat radiating surface of a radiator is to be successfully controlled by the air blocking method.

Accordingly, it is an object of this invention to provide a new and improved arrangement for regulating the effective heat radiating surface of a heat exchanger adapted to be supplied with a vaporous heating medium of variable pressure.

It is a further object of this invention to provide a new and improved arrangement of apparatus for regulating the effective heat radiating surface of a heat exchanger which is simple in construction, compact in design, and efficient in operation.

In accordance with the illustrated embodiments of my invention, I provide a relatively small motor driven air pump for supplying air into a radiator connected to a source of variable pressure steam, a vent passage being provided in the connection between the pump and the radiator which is controlled by means responsive to the temperature within the enclosure. In order to compensate for changes in pressure of the steam supplied to the radiator, a flow regulator is arranged between the air pump and the radiator which maintains a constant flow of air to the radiator regardless of varying pressure conditions, of either the air pump or the steam supply. A pressure regulator is arranged between the thermostatically controlled vent opening and the radiator so as to maintain a substantially constant pressure of the air being vented from the system. By the arrangements disclosed a modulated control of the enclosure heating is obtained which is independent of the normal pressure variations of the steam supply.

For a consideration of what I believe to be novel and my invention, attention is directed to the following description and the claims appended thereto taken in connection with the accompanying drawing.

Figure 2:
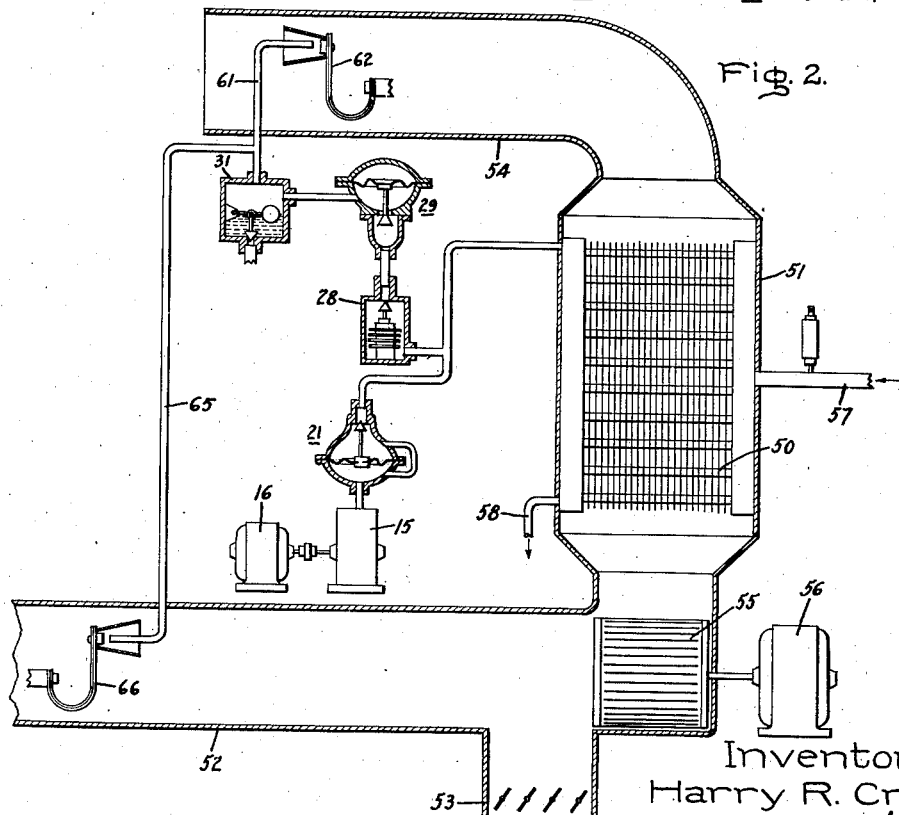

In the drawing Fig. 1 is a diagrammatic sketch illustrating one embodiment of my invention as applied for regulating the effective heat radiating surface of an individual room radiator, and Fig. 2 is a sketch illustrating a modification of the control arrangement as adapted for controlling the effective heat radiating surface of a heat exchanger of a central hot air heating unit.

Referring to Fig. 1 of the drawing, a heat exchanger or steam radiator 10 is shown which is adapted to be connected by conduit 11 to a source of variable pressure steam such as a domestic boiler furnace which is periodically fired so as to maintain the boiler steam pressure within predetermined minimum and maximum limits. The supply of steam from the inlet 11 to the radiator may be controlled by the manually operated valve 12, it being understood, however, that this valve is normally in the fully opened position during the operation of the heating control arrangement. Valve 12 is connected to the steam inlet of the radiator by a pipe 13. In this instance a one pipe heating system is illustrated in which condensate is adapted to be returned to the boiler through the steam supply pipe 11.

The heating control apparatus includes a relatively small pump 15 of any suitable type for forcing a displacement fluid, such as air, into the radiator. The pump may be driven by an electric motor 16 which during normal operation of the system is continuously energized from a suitable source of power supply (not shown). It is to be understood that the pump is of such size that the output pressure thereof is greater than the maximum steam pressure. The pump is connected by means of the pipe 19 to the radiator, a suitable flow regulator 21 being provided in the connection 19 for maintaining a substantially constant flow of air to the radiator regardless of the pressure of the output of pump 15 or the pressure obtaining within the radiator 10. Any suitable flow regulating device may be provided, numerous such devices being well known in the art. As schematically illustrated, the device may comprise a casing 22 having a diaphragm 23 arranged therein, forming upper and lower chambers within the casing with a restricted passage 24 provided around the diaphragm 23, permitting flow of air from the lower to the upper chamber. Secured to the diaphragm 23 for operation thereby is a valve 25 for regulating the flow of air into the radiator. The device will operate so that upon an abnormal increase in the output pressure of the pump 15, the valve 25 will be moved to a more closed position to limit the rate of air flow through the conduit 19. Similarly, upon an increase in pressure within the radiator 10 due to an increase in the pressure of the steam supplied thereto, the valve 25 will be moved to a more opened position to maintain the desired rate of air flow to the radiator.

Provision is made for continuously venting air from the radiator either by a conduit directly connected therewith or, as shown, through the connection 27 with pipe 19. The venting circuit includes the thermostat valve 28, pressure regulator 29, condensate trap 31 and the thermostatically controlled vent passage 32. The thermostat valve 28 may be of any suitable type well known in the art, comprising an expansible element or bellows 33 containing a thermally expansible fluid and a valve 34 which is adapted to be moved to the closed position by the bellows upon the entrance of steam into the surrounding casing thereof. The pressure regulator 29 may also be of any suitable type and as illustrated, may comprise a casing 35 having a flexible diaphragm 36 arranged therein for actuating a valve 37 so as to maintain substantially constant the pressure of air being vented. A certain amount of water vapor will be carried along with air being discharged from the radiator, some of which vapor may condense and cause a blocking of the vent passage or be forced out through the vent opening. For preventing the occurrence of either condition, I prefer to provide a condensate trap at an appropriate place in the air passage, which trap may comprise a housing having a float operated valve 38 arranged therein. The valve 38 is adapted to be moved to the open position to allow drainage of condensate from the housing through the drain connection 39 upon the level of condensate rising therein above a predetermined point.

The air vent passage or tube 32 extending from the upper portion of the condensate trap terminates at a suitable point within the enclosure being heated. The escape of air from the open end of the tube 32 is controlled by a suitable device which is responsive to the enclosure temperature. As indicated, the device may comprise a bimetallic element 41 suitably fixed at one end to a stationary part 42 and having a valve 43 adapted to cooperate with the end of the tube 32 so as to regulate the escape of air therefrom. A deflector 44 may be secured to the end of the bimetal element around the valve 43 and extending about the end of the tube 32 so as to direct the air escaping from the vent passage away from the bimetallic element. The element 41, therefore, will not be appreciably affected by the temperature of the air escaping from the vent passage. It is to be understood that the vent opening is of such a size that with the thermostat 41 removed therefrom air will be vented from the radiator 10 at a rate slightly greater than the rate at which air is supplied thereto by the air pump 15. Although the period required for completely venting the radiator of air may vary somewhat depending upon specific operating conditions, it is preferred that a period of, for example, twenty minutes is required for the radiator, if initially completely filled with air, to be vented thereof. Similarly the pump 15 is of such capacity that with normal steam pressure conditions obtaining in the radiator and with the vent opening fully closed the radiator 10 will be completely filled with air within a similar period in the event that the radiator is initially filled with steam. Such an operating period is desirable so that the thermostat element 41 and the room temperature will follow relatively closely with the variations of the effective heat radiating surface of the radiator.

The operation of the apparatus will now be described. Consider first that steam of a constant pressure is supplied to the radiator, which is partially filled with air, and that the temperature of the enclosure rises slightly above the predetermined desired value. The thermostat element 41 will bend to the left, slightly restricting the escape of air from the end of the tube 32 resulting in an increase in the amount of air forced into the radiator by pump 15. The amount of steam in the radiator will be gradually diminished and the effective heat radiating surface of the radiator will be correspondingly decreased. Since the decrease is very gradual, the room temperature will drop at a substantially corresponding rate and the thermostat element 41 will move slightly toward the right allowing an increase in the flow of air from the vent opening. Eventually a balanced condition will be reached between the heat losses from the room and the effective heat radiating surface of the radiator, and the thermostat 41 will assume such a position that the flow of air vented from the opening is substantially equal to the flow of air passed through the flow regulator 21 from the pump 15. During the continuance of this condition the amount of air within the radiator 10 will be maintained substantially constant. In the extreme case of rising room temperature the radiator may become completely filled with air and in order to prevent the passage of air into the remainder of the steam system, a thermostatically controlled vent valve 46, of any suitable type, is provided in the steam supply conduit 13. The vent passage of this valve will normally be closed as long as the conduit 13 is filled with steam but will be opened as soon as air starts to flow into the conduit 13 and which air will then be vented through the vent passage to atmosphere.

Now assume that the room temperature drops below the predetermined desired value. This will cause the thermostat element 41 to move to the right and air will be vented from the opening of tube 32 at a rate greater than the rate at which air is supplied to the radiator through the flow regulating valve 21. Accordingly, the amount of air trapped in the radiator will slowly be diminished and the effective heat radiating surface thereof increased until the thermostat 41 again becomes balanced in the position that it passes a flow of air equal to the output of the pump 15. In the extreme case of falling room temperature all of the air may be vented from the radiator 10 and as soon as steam begins to flow through the conduit 19 and connection 27 toward the vent opening, the thermostat valve 33 will effect the closure of the valve 34 to prevent the passage of steam through the vent.

Upon a change in pressure of the steam supplied to the radiator, the effective heat radiating surface thereof will tend to vary due to the compression or expansion, as the case might be, of the air trapped in the radiator. This tendency is offset, however, by automatic compensation effected by the flow regulator 21 and the pressure regulator 28. Upon an increase in the pressure of steam supplied to the radiator, the increase in pressure acting upon the upper surface of the diaphragm 23 of the flow regulator 21 will effect a movement of the valve 25 to a more opened position so that the flow of air to the radiator will not be diminished due to the increased pressure head. It is preferred that the pressure regulator 21 be of such a type that upon an increase of pressure in the radiator, the flow of air thereto from the pump will be slightly increased above the normal predetermined constant rate. Pressure regulators having such characteristics are well known in the art and need not be described here in detail. The increased pressure acting upon the lower surface of the diaphragm 36 of the pressure regulator 29 will tend to move the valve 37 to a more closed position so as to prevent a corresponding increase in the pressure of the air being vented. The pressure regulator 29 is preferably of such a type that upon an increase in the pressure of air supplied thereto, the pressure of the air discharged therefrom will drop slightly below the normal predetermined constant value. Pressure regulators having such characteristics are well known in the art and need not be described here in detail. Thus by the coaction of the flow regulator 21 and the pressure regulator 29 the volume of air within the radiator 10 will be maintained substantially constant as against any tendency for the air volume to be diminished due to the compression thereof by the increase in steam pressure.

Upon the pressure of the steam supplied to the radiator becoming fixed but at a value higher than the value prior to the change, the air pump 15 will tend to increase the volume of air within the radiator thereby diminishing the effective heat radiating surface thereof. But upon the resultant drop in room temperature, the thermostat 41 will bend to the right thereby opening wider the air vent passage of tube 32. The discharge pressure of the regulator 29 will thereupon drop resulting in an opening movement of the valve 37 so as to permit an increased flow of air therethrough. Eventually, as previously described, the system will become stabilized in such a condition that the amount of air vented from the system through the pipe 32 will be substantially equal to the output of the air pump 15 through the regulator 21, and the volume of air in the radiator will be maintained at the proper value. Conversely, upon a drop in the pressure of the steam supplied to the radiator the volume of air within the radiator 10 will tend to expand thereby decreasing the effective heat radiating surface thereof. As the pressure within the radiator 10 drops, the valve 25 of the flow regulator 21 will be moved to a somewhat more closed position, and an increased flow of air will be vented through the passage 32. Again the system will automatically stabilize with the volume of air within the radiator being held constant and with air being vented from the tube 32 at substantially the same rate at which it is passed by the flow regulator 21.

It is obvious that the control arrangement described above is equally applicable for regulating the effective heat radiating surface of a heat exchanger of a central air conditioning unit. The radiator 10 described above, therefore, may be any heat exchanger, the effective heat radiating surface of which is to be regulated in accordance with the temperature conditions of the associated enclosure.

In the modification shown in Fig. 2 the control apparatus is illustrated as adapted for regulating the effective heat radiating surface of a heat exchanger for a central hot air unit. Referring to Fig. 2, the heat exchanger 50 is shown arranged within a suitable enclosing housing 51 having a recirculated air inlet duct 52, a fresh air inlet duct 53, and a delivery air outlet duct 54. A suitable blower 55 driven by motor means 56 is provided for forcing the circulation of air through the duct system including the heat exchanger. Steam is adapted to be supplied to the heat exchanger from a suitable boiler (not shown) through the connection 57, while condensate is adapted to be returned to the boiler through the drain connection 58.

The major portion of the control apparatus is substantially similar to that previously described, and similar elements are given the same reference characters as are used in connection with Fig. 1. In order, however, that a more satisfactory control of the enclosure temperature may be obtained with the central air conditioning unit, I prefer to provide a dual control for the air being vented from the heat exchanger. Extending from the upper portion of the condensate trap 31 is one air vent tube 61 the open end of which extends within the delivery air duct 54, the passage of air therefrom being regulated by a temperature responsive device 62 similar to the device 41 previously described in connection with the first modification. A branch air vent tube 65 communicating with the tube 61 adjacent the condensate trap 31 has an open end extending within the recirculated air duct 52, the passage of air therefrom being regulated by a temperature responsive device 66 which also is similar to the devices 62 and 41. It is to be understood that the vent openings of the tubes 61 and 65 need not necessarily be located within the ducts 54 and 52, respectively, as shown, but they may be located at any convenient place while the escape of air from the vents may be controlled by any suitable means responsive to the air temperature within the corresponding ducts. The device 66 is so adjusted that with the opening of tube 61 closed, it will regulate the venting of air from the tube 65 and hence the effective heat radiating surface of the heat exchanger 50 so as to maintain some suitable air temperature, such as approximately 70 degrees, within the return duct 52. Should the temperature of the air passing through this duct rise above such value, the device 66 will bend to the right so as to close slightly the vent passage whereby the volume of air within the heat exchanger is increased to diminish the effective heat radiating surface thereof. Under certain conditions the air temperature in duct 52 may be such that substantially the entire heat exchange may be filled with air. The temperature of the air then circulated to the enclosure by the blower 55 may drop to such a low value due to the low temperature of the air drawn into the system from outdoors through the fresh air inlet 53 as to cause discomfort to the occupants of the enclosure, particularly those near the duct openings. To prevent this the temperature responsive device 62 is so adjusted that while it normally closes the opening of the vent tube 61, it will move to the vent opening position upon the temperature of the air passing through the delivery duct 54 falling below a predetermined value such as 60 degrees. By this arrangement even though the temperature responsive device 66 in the return duct 52 is maintained in the fully closed position by the high temperature of the returning air, the temperature responsive device 62 will move to such a vent opening position that a certain amount of steam will be left in the heat exchanger so that the temperature of the air passing through the delivery duct 54 will be maintained above the predetermined value such as 60 degrees as assumed. By this arrangement, under the conditions assumed, the air delivered to the enclosure will be tempered so as not to cause any discomfort to the occupants.

With the exception of the additional feature described above in connection with the dual vent control, the operation of the control system for the second modification is substantially similar to that described above.

Having described the principle of operation of my invention together with the apparatus which I now consider to represent the best embodiment thereof, I desire to have it understood that the apparatus shown is merely illustrative and that the invention may be carried out by other means.

What I claim as new and desire to secure by Letters Patent of the United States, is:

1. Heating control apparatus for a radiator connected to a source of variable pressure steam, said apparatus comprising the combination of an air pump, conduit means including a flow regulator means connecting said pump to said radiator, said flow regulator means being arranged to maintain a substantially constant flow of air into said conduit means during normal variations in steam pressure, conduit means connected to said radiator for venting air therefrom, and means responsive to the temperature regulated by said radiator for controlling the escape of air from said last mentioned conduit means.

2. In a heating control system for a heat exchanger connected to a steam source and arranged within an enclosure to be heated, a source of air connected to said heat exchanger, said source of air being under a pressure greater than the pressure of said steam source, means for maintaining a substantially constant flow of air from said source to said heat exchanger, an air vent communicating with said heat exchanger, means for maintaining substantially constant the pressure of air flowing to said vent, and means responsive to the enclosure temperature for controlling the passage of air from said vent.

3. In combination with a radiator connected to a steam source and arranged within an enclosure to be heated, a source of air under a pressure greater than said steam source, conduit means for conducting air from said source to said radiator, conduit means including a pressure regulator means for venting air from said radiator, said pressure regulator means being arranged to maintain a substantially constant value of pressure of air in said second conduit means during normal variations in steam pressure, and means responsive to the enclosure temperature for regulating the escape of air from said pressure regulator means.

4. In a heating control system for a heat exchanger associated with an enclosure and connected to a source of steam, an air pump connected for supplying air to said heat exchanger, a flow regulator means for maintaining substantially constant the flow of air from said pump to said heat exchanger, an air vent connected to said heat exchanger for venting air therefrom, a pressure regulator means for maintaining substantially constant the pressure of air allowed to pass to said vent, and means responsive to the enclosure temperature for regulating the escape of air from said vent.

5. In a heating control system for a heat exchanger adapted to be supplied with a heating medium at a variable pressure, said heat exchanger being arranged for regulating the temperature of an enclosure, a source of displacement fluid under pressure greater than the maximum pressure of said heating medium, conduit means including a flow regulator means connecting said source of displacement fluid to said heat exchanger, said flow regulator means being arranged to maintain a substantially constant flow of air into said conduit means during normal variations in pressure of said heating medium, conduit means including a pressure regulator means for venting displacement fluid from said heat exchanger, said pressure regulator means being arranged to maintain a substantially constant value of pressure of the air in said second conduit means during normal variations in pressure of said heating medium, and means responsive to the temperature conditions within said enclosure for regulating the escape of displacement fluid from said pressure regulator means.

6. In a heating control system for a radiator connected to a source of variable pressure steam, a source of air under pressure greater than the maximum steam pressure, conduit means including a flow regulator means connecting said pressure air source to said radiator whereby a continuous and substantially constant flow of air is supplied to said radiator, conduit means including a pressure regulator means for conducting a substantially continuous flow of air from said radiator, means responsive to the temperature conditions effected by said radiator for regulating the flow of air from said pressure regulator means.

7. In a heating control system for a heat exchanger adapted to be supplied with a heating fluid, a recirculated air inlet duct, a fresh air inlet duct, and a delivery air outlet duct for said heat exchanger, means for regulating the effective heat radiating surface of said heat exchanger comprising a source of pressure air, conduit means for conducting a continuous regulated supply of air from said source to said heat exchanger, conduit means communicating with said heat exchanger having a first air vent and a second air vent, means responsive to the temperature of air flowing from said heat exchanger, said last mentioned means normally maintaining said first vent closed and adapted to move to the vent opening position upon the occurrence of a predetermined low temperature condition, means responsive to the temperature of air supplied to said heat exchanger through said recirculated air inlet duct for regulating the escape of air from said second vent.

8. In a heating control system for a heat exchanger adapted to be supplied with a heating fluid, a recirculated air inlet duct, a fresh air inlet duct, and a delivery air outlet duct for said heat exchanger, means for regulating the effective heat radiating surface of said heat exchanger comprising means for supplying a substantially constant flow of air to said heat exchanger, first and second air vents for said heat exchanger, means responsive to the temperature of air in said delivery air outlet duct for regulating the escape of air from said first vent, and means responsive to the temperature of air within said recirculated air inlet duct for regulating the escape of air from said second vent.

9. In a heating control system for a heat exchanger adapted to be supplied with a heating fluid, a recirculated air inlet duct, a fresh air inlet duct, and a delivery air outlet duct for said heat exchanger, means for regulating the effective heat radiating surface of said heat exchanger comprising means for supplying a substantially constant flow of air to said heat exchanger, conduit means for venting air from said heat exchanger, means responsive to the temperature of air within said recirculated air inlet duct for regulating the escape of air from said conduit means, and normally inoperative means responsive to a predetermined low temperature condition in said delivery air outlet duct for permitting escape of air from said conduit means independently of said first temperature responsive means.

10. In a heating control system for a heat exchanger adapted to be supplied with a heating fluid, a recirculated air inlet duct, a fresh air inlet duct, and a delivery air outlet duct for said heat exchanger, means for regulating the effective heat radiating surface of said heat exchanger comprising a source of pressure air, conduit means including a flow regulator means for conducting air from said source to said heat exchanger, said flow regulator means being arranged to maintain a substantially constant flow of air into said conduit means during normal variations in pressure of said heating fluid, conduit means including a pressure regulator means for venting air from said heat exchanger, said pressure regulator means being arranged to maintain a substantially constant value of pressure of the air in said second conduit means during normal variations in pressure of said heating fluid, means responsive to the temperature conditions within said recirculated air inlet duct for normally regulating the escape of air from said venting conduit means and means responsive to the temperature condition within said delivery air outlet duct for regulating the escape of air from said venting conduit means under predetermined low temperature conditions.

11. For use with an air conditioner having a heat exchanger connected to a source of heating fluid, a recirculated air inlet duct, a fresh air inlet duct, and a delivery air outlet duct, apparatus for controlling the effective heat radiating surface of said heat exchanger comprising a source of air under pressure greater than the pressure of the heating fluid supplied to said heat exchanger connected to said heat exchanger, means for regulating the supply of air into said heat exchanger, conduit means communicating with said heat exchanger and having a vent opening in said recirculated air inlet duct, means responsive to the temperature of air in said recirculated air inlet duct for regulating the escape of air from said vent opening, conduit means communicating with said heat exchanger having an air vent opening in said delivery air outlet duct, and means responsive to the temperature of the air in said delivery air outlet duct for regulating the escape of air from said vent opening.

12. For use with an air conditioner having a heat exchanger adapted to be supplied with a heating fluid, a recirculated air inlet duct, a fresh air inlet duct, and a delivery air outlet duct for said heat exchanger, means for regulating the effective heat radiating surface of said heat exchanger comprising a source of air under pressure greater than the pressure of said heating fluid supplied to said heat exchanger, conduit means for conducting a continuous supply of air from said source to said heat exchanger, conduit means communicating with said heat exchanger and having an air vent arranged within said delivery air outlet duct, means responsive to the temperature of air in said delivery air outlet duct, said last mentioned means normally maintaining said vent closed and adapted to move to the vent opening position upon the occurrence of a predetermined low temperature condition, conduit means communicating with said heat exchanger having an air vent in said recirculated air inlet duct, means responsive to the temperature of air within said last mentioned duct for regulating the escape of air from said last mentioned vent.

HARRY R. CRAGO.